US010163317B2

(12) United States Patent
Song et al.

(10) Patent No.: US 10,163,317 B2
(45) Date of Patent: Dec. 25, 2018

(54) SERVER, SYSTEM, METHOD AND RECORDING MEDIUM FOR SEARCHING FOR MISSING CHILDREN USING MOBILE CROWDSOURCING

(71) Applicant: Korea Advanced Institute of Science and Technology, Daejeon (KR)

(72) Inventors: Junehwa Song, Daejeon (KR); Hyojeong Shin, Santa Clara, CA (US); Taiwoo Park, East Lansing, MI (US); Seungwoo Kang, Cheonan (KR); Bupjae Lee, Seoul (KR); Yohan Chon, Seoul (KR)

(73) Assignee: KOREA ADVANCED INSTITUTE OF SCIENCE & TECHNOLOGY (KAIST), Daejeon (KR)

( * ) Notice: Subject to any disclaimer, the term of this patent is extended or adjusted under 35 U.S.C. 154(b) by 617 days.

(21) Appl. No.: 14/667,714

(22) Filed: Mar. 25, 2015

(65) Prior Publication Data

US 2016/0117904 A1 Apr. 28, 2016

(30) Foreign Application Priority Data

Oct. 24, 2014 (KR) ........................ 10-2014-0145483

(51) Int. Cl.
*G06Q 10/08* (2012.01)
*H04W 4/02* (2018.01)
*G08B 21/02* (2006.01)

(52) U.S. Cl.
CPC ..... *G08B 21/0269* (2013.01); *G08B 21/0263* (2013.01)

(58) Field of Classification Search
CPC .................................................. G08B 21/0269
See application file for complete search history.

(56) References Cited

U.S. PATENT DOCUMENTS

2006/0071783 A1* 4/2006 Culpepper ............ B60R 25/102 340/539.13
2010/0262367 A1* 10/2010 Riggins .................. G06Q 10/10 701/533

(Continued)

FOREIGN PATENT DOCUMENTS

KR 10-1178041-0000 2/2012

OTHER PUBLICATIONS

Shin et al., CoSMiC: Designing a Mobile Crowd-sourced Collaborative Application to Find a Missing Child in Situ, MobileHCI '14, Sep. 2014, Toronto, ON, Canada.

(Continued)

*Primary Examiner* — Joseph Feild
*Assistant Examiner* — Pameshanand Mahase
(74) *Attorney, Agent, or Firm* — Cho-Won IP Consulting; Hyun Ho Song

(57) ABSTRACT

Disclosed herein are a server, system, method, and recording medium for searching for missing children, using mobile crowdsourcing. According to an embodiment, a server for searching for missing children, using mobile crowdsourcing, comprises a communication unit and a control unit. The communication unit receives a missing-child incident signal from a guardian terminal (held by a parent or guardian) and receives a first location information as to movements of a missing child from a child terminal (carried by the missing child) and sends the first location information received to at least one assistance terminal and receives landmark information from the assistance terminal(s) when a (degree of) similarity between the first location information sent to the assistance terminal(s) and a second location information detected by the assistance terminal(s) is higher than a preset value. The control unit generates a movement or moving (Continued)

path of the missing child, using the landmark information received.

20 Claims, 5 Drawing Sheets

(56) References Cited

U.S. PATENT DOCUMENTS

| | | | | |
|---|---|---|---|---|
| 2011/0077023 | A1* | 3/2011 | Won | H04W 4/02<br>455/456.1 |
| 2012/0008526 | A1* | 1/2012 | Borghei | H04W 4/021<br>370/254 |
| 2014/0197948 | A1* | 7/2014 | Mo | H04W 64/00<br>340/539.13 |

OTHER PUBLICATIONS

Lee et al., Elekspot: A Platform for Urban Place Recognition via Crowdsourcing, 2012 IEEE/IPSJ 12th International Symposium on Applications and the Internet (SAINT 2012), Jul. 2012, pp. 190-195, Izmir, Turkey.

* cited by examiner

SERVER, SYSTEM, METHOD AND RECORDING MEDIUM FOR SEARCHING FOR MISSING CHILDREN USING MOBILE CROWDSOURCING

BACKGROUND

1. Field of Invention

The present invention relates to a server, system, method, and recording medium for searching for missing children using mobile crowd sourcing. More particularly, the present invention relates to a server, system, method, and recording medium based on mobile crowdsourcing, which detects a location of a missing child using on not only a physical encounter but also a virtual encounter with the child.

2. Description of Related Art

In the United States, the number of missing children reaches 800,000 per year, and this not only brings forth waste in financial, psychological, and societal resources but also causes great emotional distress for the families of missing children. In Korea, the number of children aged two to eight is three million, and that of the elderly suffering from various symptoms of dementia is 500,000—thus, making the total number of people with potential for getting lost or going missing, approximately four million. As such, higher priority is being given to missing-child prevention and justification for increased expenditure therefor, becoming more important, especially with increased attention to social welfare by the society at large.

At amusement and theme parks alone, 20 to 30 children get lost during a weekend at one location, and on the Children's Day (or a local equivalent thereto), over a hundred get lost—adding on to the parents' anxiety. Nevertheless, service for finding missing children is in a much inadequate state.

As an example, there is a technique for finding a (missing) child by tracking an RFID necklace, belt, or badge on the child. However, when a child goes missing, this technique requires that the child necessarily pass through a point in an area (within range) of an RFID reader after the incident is reported to a proper authority. Valuable time may be lost during this process, and even if the child's location is ascertained, finding the child may still be of great difficulty as the child may move to another area. This technique limited to a confined area in which an RFID reader is installed; thus, where a missing child moves outside of the confined area, the technique cannot be used to find the child.

Therefore, service providing missing child location without additional infrastructure and preliminary information gathering is needed.

BRIEF SUMMARY

According to a server, system, method, and recording medium for searching for missing children using mobile crowd sourcing, according to the present invention, a missing child's movements may be traced or tracked based on location information provided by a plurality of people (or crowd participation), the parents or guardians may acquire a more accurate moving path of the missing child.

According to an embodiment of the present invention, a server for searching for missing children using mobile crowdsourcing may comprise: a communication unit for receiving a missing-child incident signal from a guardian terminal and receiving a first location information as to movements of a missing child from a child terminal on the missing child and transmitting the first location information received to at least one assistance terminal and receiving landmark information from the at least one assistance terminal when a degree of similarity between the first location information transmitted to the at least one assistance terminal and a second location information detected by the at least assistance terminal is higher than a preset value; and a control unit for generating a moving path of the missing child, using the landmark information received. The server may further comprise a storage unit for storing the moving path of the missing child generated by the control unit.

According to an embodiment, the communication unit may transmit the moving path of the missing child generated to the guardian terminal, and the control unit may sort the second location information transmitted from the assistance terminal in a chronological order and generates the moving path of the missing child.

According to an embodiment, the first location information may be wireless signal information detected by the child terminal, and the second location information may be wireless signal information detected by the at least one assistance terminal. The wireless signal information may include information from such sources as a nearby Wi-Fi access point and Bluetooth beacon. The wireless signal information may include information associated with such sources.

According to an embodiment, the landmark information may be information inputted by a user of the assistance terminal and transmitted to the communication unit and be at least one of address, building name, business name, image captured, recorded file and message.

According to an embodiment of the present invention, a system for searching for missing children using mobile crowdsourcing may comprise: a server according to an embodiment (e.g., as described above); a child terminal for detecting wireless signal and transmitting the first location information based on the wireless signal detected to the guardian terminal or the server; a guardian terminal for receiving the first location information from the child terminal and transmitting the first location information received and the missing-child incident signal to the server; and at least one assistance terminal for receiving the first location information and evaluating a similarity between the first location information transmitted and the second location information detected by the at least one assistance terminal and generating and transmitting the landmark information to the server when the similarity evaluated is higher than a preset value.

According to an embodiment, the control unit may sort the second location information transmitted from the assistance terminal in a chronological order and generate the moving path of the missing child.

According to an embodiment, the guardian terminal may further comprise an interface unit for outputting the moving path of the missing child received from the server.

According to an embodiment, the child terminal may transmit the first location information to the guardian terminal or the server using the wireless signal detected.

According to an embodiment, when the guardian terminal or the server requests the first location information, the child terminal may transmit the first location information to the guardian terminal or the server by using the wireless signal detected.

According to an embodiment, the assistance terminal may evaluate a similarity between the first location information received and a second location information self-detected by the assistance terminal (transmitting the second location information).

According to an embodiment, the similarity may be evaluated by using at least one of cosine similarity, Tanimoto coefficient similarity, and rank-based similarity calculations.

According to an embodiment, the assistance terminal may comprise an interface unit for outputting an assistance request message when the similarity is higher than the preset value.

According to an embodiment, the guardian terminal and the child terminal may be wirelessly connected.

According to an embodiment of the present invention, a method for searching for missing children using mobile crowdsourcing may comprise: a child terminal transmitting a first information based on wireless signal detected to a guardian terminal; the guardian terminal transmitting the first location information and missing child incident signal to a server; the server transmitting the first location information received from the child terminal or the guardian terminal to an assistance terminal; the assistance terminal evaluating a similarity between the first location information transmitted and a second location information detected by the assistance terminal and when the similarity evaluated is higher than a preset value, outputting an assistance request message to an interface unit of the assistance terminal; the assistance terminal transmitting landmark information inputted by an assistance terminal user, who recognizes the assistance request message, to the server; and the server generating a moving path of the missing child using the landmark information transmitted.

According to an embodiment, the method for searching for missing children using crowdsourcing may further comprise the server transmitting the moving path generated to the guardian terminal.

According to an embodiment of the present invention, a program, which is stored in a computer-readable recording medium, may perform the method for searching for missing children using crowdsourcing.

DETAILED DESCRIPTION

Hereafter, various embodiments of the present invention are described in reference to the accompanying drawings.

Figure 1:
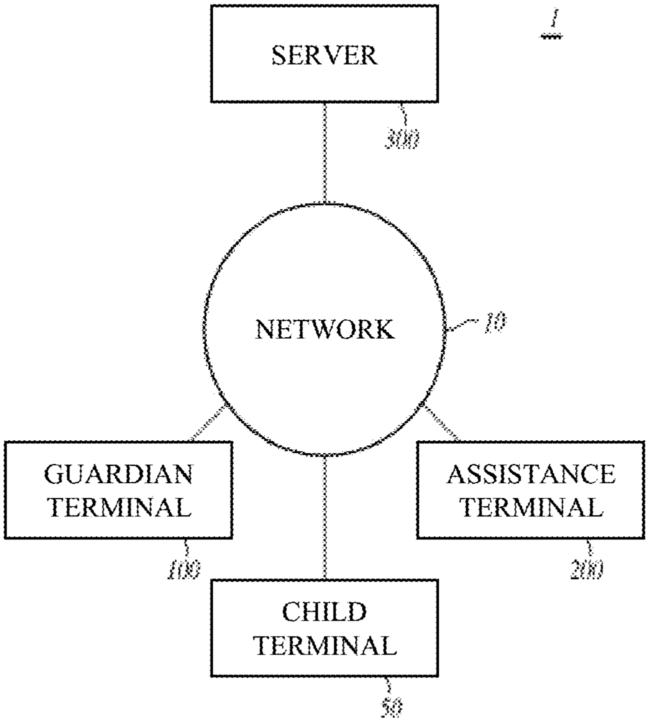
FIG. 1 shows a block diagram of a system for searching for missing children, according to an embodiment.

FIG. 1 shows a block diagram of a system for searching for missing children, according to an embodiment.

Referencing FIG. 1, a system 1 for searching for a missing child comprises a network (10), a child terminal (50), a guardian terminal (100), an assistance terminal (200), and a server (300).

The guardian terminal (100) may be a terminal for transmitting an actual missing child alert or incident signal to the server (300). More particularly, the guardian terminal (100) may receive a first location information from the child terminal (50) and transmit the first location information received and the missing child incident signal to the server (300).

The guardian terminal (100) may comprise a display capability and access the server (300) via a wireless network. The guardian terminal (100) may also send messages and is capable of data/file transmission. The guardian terminal (100) may be at least one device from such devices as smart phone, a desktop/laptop computer, a tablet PC, PDA, and IPTV.

The child terminal (50) may be a terminal, which a child carries with himself or herself. For example, the child terminal (50) may be a wearable smart-tag or other mobile device, which is capable of radio sensing and wireless monitoring and transmission.

The child terminal (50) may detect a plurality of wireless signals from multiple wireless communication devices (e.g., Wi-Fi access point (AP), Bluetooth beacon) in a vicinity of the child terminal (50) at a regular or irregular (e.g., random) interval and transmit a first location information generated based on information from each of the plurality of wireless signals detected to the guardian terminal (100) or the server (300). The wireless signal information may (also) include information on/for nearby Wi-Fi access points (AP's) and Bluetooth beacons, as well as mobile network addresses.

The first location information is scanned and stored by the child terminal (50), for example, on a time interval basis and may include such information as a serial number, signal strength, and other data for a wireless communication device.

The child terminal (50) may transmit a first location information associated with wireless signal detected by the child terminal (50) to the server (300). Also, the child terminal (50) may transmit the first location information detected by the child terminal (50) to the guardian terminal (100) or the server (300), at a regular or irregular interval. For example, where the child terminal (50) and the guardian terminal (100) are connected via a local area or short-range wireless communication (network), the first location information may be transmitted to the guardian terminal (100) at a regular interval. Also, for example, where the child terminal (50), the guardian terminal (100), and the server (300) are connected via a mobile network, the child terminal (50) may transmit the first location information to the server (300) or simultaneously, to the guardian terminal (100) and the server (300).

Also, for example, when a first location information is requested from the guardian terminal (100) or the server (300), the child terminal (50) may transmit the first location information to the guardian terminal (100) or the server (300). In this situation and where the child terminal (50) is connected only to the guardian terminal (100) via a local area or short range wireless communication (network), the first location information may be transmitted only to the guardian terminal (100). In the same situation but where the child terminal (50) is connected to the guardian terminal (100) and the server (300) via a mobile network, the first location information may be transmitted to the server (300) or simultaneously, to the guardian terminal (100) and the server (300).

The assistance terminal (200) is connected to the server (300) and the network (10). Like the child terminal (50), the assistance terminal (200) detects a plurality of wireless signals from multiple wireless communication devices (e.g., Wi-Fi access point (AP), Bluetooth beacon) in a vicinity of the assistance terminal (200) at a regular or irregular (e.g., random) interval and generate and stores a second location information based on information from each of the plurality of wireless signals detected. The second location information may be scanned and stored by the assistance terminal (200), for example, on a time-interval basis and may include such information as a serial number, signal strength, and other data for a wireless communication device.

The assistance terminal (200) receives through the server (300), a first location information transmitted to the server (300) by the child terminal (50) or through the guardian terminal (100). The assistance terminal (200) compares/contrasts the first location information received with the second location information detected by the assistance terminal (200) and when a similarity of the location information(s) is higher than a preset or given value, a user of the assistance terminal (200) may generate and transmit to the server (300), a landmark information, which includes at least one of address, building name, business name, captured and other images, record and other files, and messages, by using an input unit of the assistance terminal (200).

The assistance terminal (200) may calculate and evaluate a (degree of) similarity between a first location information and a second location information using at least one of cosine similarity calculation, Tanimoto coefficient (similarity calculation), and rank-based similarity calculation methods. The assistance terminal (200) may evaluate a similarity involving a second location information, which is self-detected by the assistance terminal (200). Using the calculation methods, a similarity is evaluated based on a given signal strength (value) among a plurality of wireless signals (and information there from) acquired at a given/particular point or location by the assistance terminal (200).

To describe the similarity calculation methods in more detail, the cosine similarity calculation is a method that uses a cosine value for an angle between two vectors to evaluate a cosine similarity, which denotes a similarity between the vectors. The Tanimoto coefficient similarity calculation is a method that uses a Tanimoto Coefficient or an index for evaluating a similarity of two groups or sets. The rank-based similarity calculation is a method that uses a rank value instead of signal strength value of AP vectors to calculate a similarity.

The assistance terminal (200) may comprise a display capability and access the server (300) via a wireless network. The assistance terminal (200) may also send messages and is capable of data/file transmission. The assistance terminal (200) may be at least one device from such devices as smartphone, a desktop/laptop computer, a tablet PC, PDA, and IPTV.

The server (300) may receive information inputted by a user of the guardian terminal (100) and the assistance terminal (200) and store the information received. The server (300) is described in more detail with reference to FIG. 4, later.

The network (10) is a network capable of wireless communication and may, for example, be a mobile network (e.g., 3G, LTE).

Figure 2:
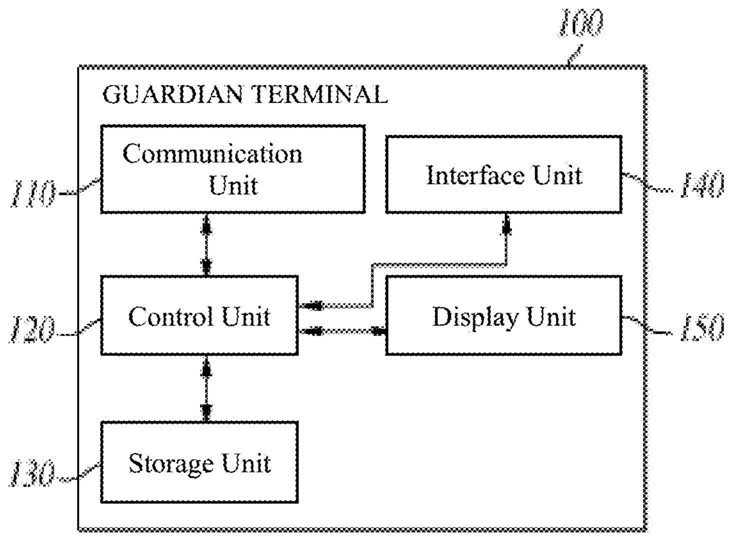
FIG. 2 shows a block diagram of a guardian terminal according to an embodiment.
Figure 3:
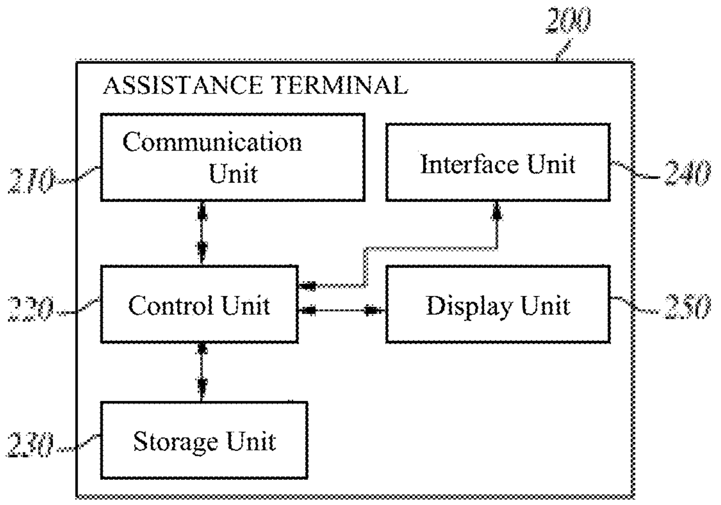
FIG. 3 shows a block diagram of an assistance terminal according to an embodiment.

FIG. 2 shows a block diagram of a guardian terminal according to an embodiment, and FIG. 3, a block diagram of an assistance terminal according to an embodiment.

Referencing FIG. 2 the guardian terminal (100) may comprise a communication unit (110), a control unit (120), a storage unit (130), an interface unit (140), and a display unit (150). Referencing FIG. 3, the assistance terminal (200) may comprise a communication unit (210), a control unit (220), a storage unit (230), an interface unit (240), and a display unit (250).

The communication units (110) transmits information generated by the control unit (120) to the server (300), and the communication unit (220) transmits information generated by the control unit (220) to the server (300).

The control units (120, 220) execute command or instruction and performs tasks associated with the guardian terminal (100) and the assistance terminal (200), respectively. For example, the control units (120, 220) use command (searched) from the (respective) storage units (130, 230) and control input, output, data reception and processing between/among components/units in the guardian terminal (100) or the assistance terminal (200), respectively.

The control units (120, 220) execute program codes (along) with operating systems and perform such tasks or operations as data generation and utilization. (Operating systems are generally known and description thereabout is omitted.) For example, the operating systems may be a Window-based OS, UNIX, LINUX, Palm OS, DOS, Android, iOS and McIntosh, etc. Operating systems, other computer codes, and data may exist in the storage units (130, 230), which operate while configured to be connected with the (respective) control units (120, 220).

The control units (120, 220) may recognize user action and control the guardian terminal (100) or the assistance terminal (200), respectively, based on the user action recognized. The user action may, for example, comprise a pressing of a physical button on a user terminal or remote control, making of a prescribed touch/gesture on touch-screen display or selecting a soft button thereon, and making a prescribed vocalization or sound, which is receivable and recognizable by a sound detection unit.

The control units (120, 220) may be constructed or implemented as a single chip, a multi-chip, or a plurality of electrical components. Various architecture including an exclusive, dedicated, or embedded processor, a single-purpose processor, a controller, and ASIC, etc., may be used for the control units (120, 220).

The storage units (130, 230) provides storage for program code and data generally used by the guardian terminal (100) and the assistance terminal (200), respectively. The program code and data may be in such languages as HTML, XML, HTML5, CSS, CSS3, Java Script, Java, C language, C++, Visual C++, and C#.

The storage units (130, 230) may be constructed or implemented as a ROM, RAM, hard disk drive, etc. Program code and data may exist in detachable storage medium and when needed, may be installed or loaded onto the guardian terminal (100) or the assistance terminal (200). The detachable storage medium may include a CD-ROM, PC Card, memory card, floppy disk, magnetic tape, and network components.

The interface units (140, 240) detect the user action and outputs the user action detected to the control unit (120, 220). The control units (120, 220) may recognize user action based on results outputted by the interface units (140, 240). The interface unit (140) in the guardian terminal (100) may output the moving path of the missing child received from the server (300). The interface unit (240) in the assistance terminal (200) may output a help request or assistance request message when a similarity between a first location information transmitted by the child terminal (50) through the server (300) and a second location information detected by the assistance terminal (200) is higher than a preset value. When outputting the assistance request message, such alarms and notifications as vibration, sound, and display flash (lights) may be used to get user attention from (a user of) the assistance terminal (200). The assistance request message may include a missing child search and other related in-progress message and request for input of a landmark information.

The display units (150, 250) display at least one link for providing information according control by the respective control units (120, 220).

Figure 4:
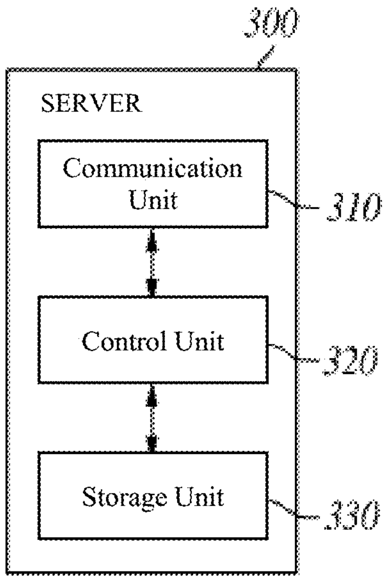
FIG. 4 shows a block diagram of a server according to an embodiment.

FIG. 4 shows a block diagram of a server according to an embodiment.

Referencing FIG. 4, the server (300) comprises a communication unit (310), a control unit (320), and a storage unit (330).

The communication unit (310) receives a missing child alert or incident signal from the guardian terminal (100) and receives a first location information according to the missing child's movements from the missing child's child terminal (50). The communication unit (310) transmits the first location information received to at least one assistance terminal (200). Also, where the at least one assistance terminal (200), which receives the first location information, transmits a landmark information, the communication unit (310) may receive the landmark information.

The control unit (320) may generate a moving path of the missing child by using the landmark information received. That is, the control unit (320) may generate the moving path of the missing child by sorting the landmark information received from the assistance terminal (200) in a chronological order. The communication unit (310) may (then) transmit the moving path generated to the guardian terminal (100).

The storage unit (330) may store the moving path of the missing child generated by the control unit (320).

Figure 5:
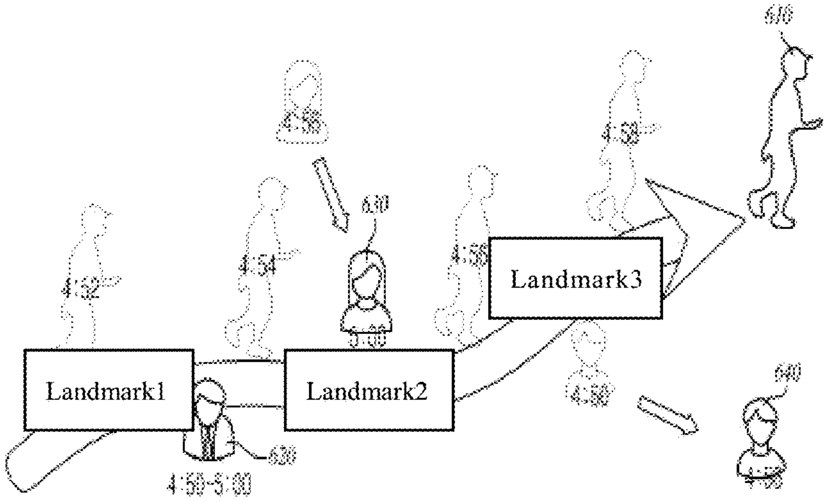
FIG. 5 shows a diagram of a potential moving path of a missing child system, according to an embodiment.

FIG. 5 shows a diagram of a potential moving path of a missing child system, according to an embodiment.

Referencing FIG. 5, FIG. 5 schematically shows a moving path of a missing child 610 generated by the server (300) based on a landmark information, which is transmitted to the server (300) by users 620, 630, 640 of the assistance terminal (200), when a similarity between wireless signal information detected by the assistance terminal (200) and the guardian terminal (100) is higher than a preset value. The moving path may be displayed through the display unit (150) in the guardian terminal (100). Using the wireless signal information detected by the assistance terminal (200) and the guardian terminal (100) in this regard, a number of people who provide information (e.g., concerning a missing child) may be increased, and more information may be obtained than that from people who actually see a missing child; and a more accurate moving path of a missing child may thus be generated.

Figure 6A:
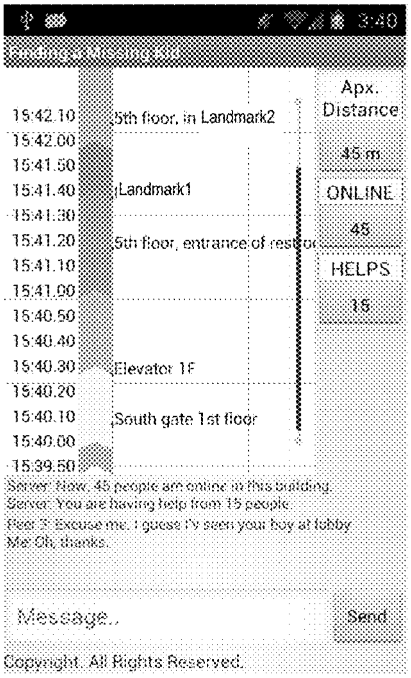
FIG. 6(*a*) and FIG. 6(*b*) show diagrams of display units for a guardian terminal and an assistance terminal, respectively, according to embodiments.
Figure 6B:
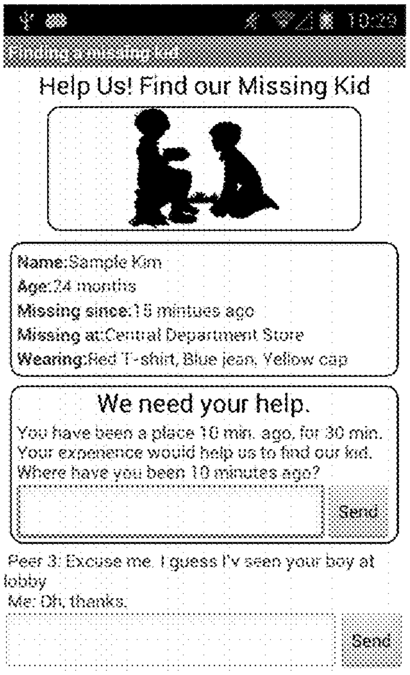

FIG. 6(*a*) and FIG. 6(*b*) show diagrams of display units for a guardian terminal and an assistance terminal, respectively, according to embodiments.

Referencing FIG. 6(*a*), the display unit (150) in the guardian terminal (100) displays data for a moving path of a missing child and a number or list of people who may offer help or assistance with respect to a location where the child has gone missing. The display unit (150) in the guardian terminal (100) comprises a message input portion, which enables message transmission between the guardian terminal (100) and the assistance terminal (200).

Referencing FIG. 6(*b*), the display unit (250) in the assistance terminal (200) displays information on a missing child. The missing child information may be at least one of the missing child's name, age, gender, missing time, missing location, and appearance and further include text, image, and sound (data). The display unit (250) in the assistance terminal (200) comprises a message input portion, which enables message transmission between the guardian terminal (100) and the assistance terminal (200).

Also, the display unit (250) in the assistance terminal (200) may comprise a portion for inputting location information as a where a user of the assistance terminal (200) was at an arbitrary time. For example, the display unit (250) in the assistance terminal (200) may display an input portion for inputting location information as to where the user (of the assistance terminal (200)) was at 10 minutes prior to receiving an assistance request message. That is, the arbitrary time is set with respect to a point when (the user of) the assistance terminal (200) was or is at a location, where a second location information detected by the assistance terminal (200) is determined to be similar to a first location information detected by the child terminal (50). In the above example, a request for inputting location information for the temporary point 10 minutes prior in time indicates that a missing child (highly) probably has passed that temporary point.

Figure 7:
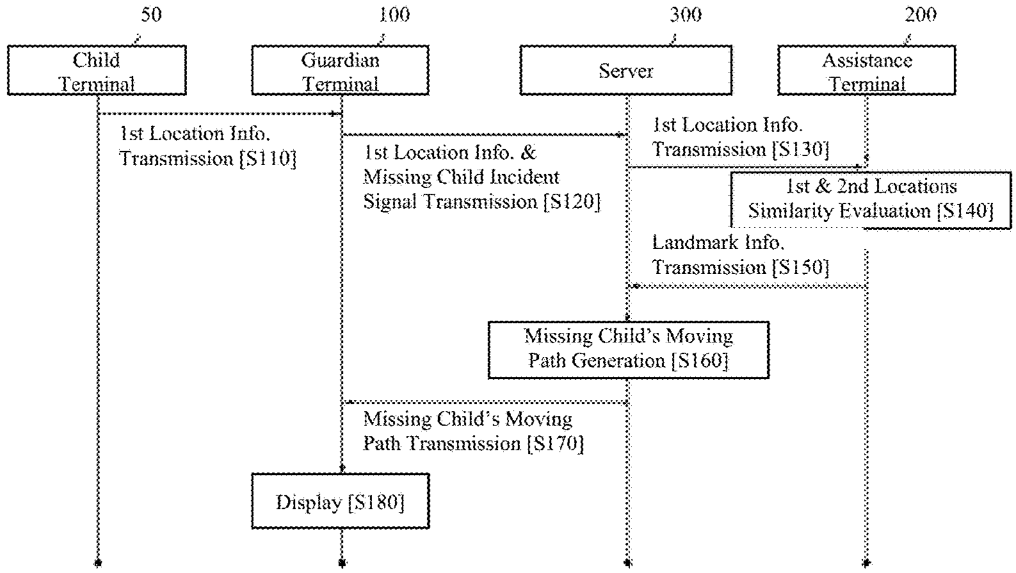
FIG. 7 shows a flowchart of a method for searching for missing children, according to an embodiment.

FIG. 7 shows a flowchart of a method for searching for missing children, according to an embodiment.

Referencing FIG. 7, the child terminal (50) transmits a first location information based on wireless signal(s) detected by the child terminal (50) to the guardian terminal (100): S110. At this time, the child terminal (150) may also transmit the first location information to the server (300).

More particularly, the child terminal (50) may detect a plurality of wireless signals from multiple wireless communication devices (e.g., Wi-Fi access point (AP), Bluetooth beacon, etc.) in a vicinity of the child terminal (50) at a regular or irregular (random) interval and transmit a first location information generated based on information from each of the plurality of wireless signals detected to the guardian terminal (100) or the server (300). The wireless signal information may include information on/for nearby Wi-Fi access point (AP) and Bluetooth beacon, as well as mobile network addresses.

Next, where the first location information is transmitted by the child terminal (50) as above, the guardian terminal (100) transmits the first location information and a missing child incident signal to the server (300): S120.

Next, the server (300) transmits the first location information received from the child terminal (50) or the guardian terminal (100) to the assistance terminal (200): S130.

Next, the assistance terminal (200) calculates and evaluates a (degree of) similarity between the first location information and a second location information detected by the assistance terminal (200): S140. The second location information may be a second location information, which is self-detected by the assistance terminal (200) or detected by at least one of a plurality of (other) assistance terminals (200). When the similarity calculated is higher than a preset value the assistance terminal (200) may out an assistance request message through an interface unit of the assistance terminal (200).

Next, the assistance terminal (200) transmits a landmark information inputted by user (of the assistance terminal (200)), who notices the assistance request message outputted, to the server (300): S150.

To describe S140 and S150 in more detail, the assistance terminal (200) detects a plurality of wireless signals from multiple wireless communication devices (e.g., Wi-Fi access point (AP), Bluetooth beacon) in a vicinity of the assistance terminal (200) at a regular or irregular (random) interval and generates and stores a second location information based on information from each of the plurality of wireless signals detected. The second location information may be scanned and stored by the assistance terminal (200) on a time-interval basis and may include such information as a serial number, signal strength, and other data for a wireless communication device.

The assistance terminal (200) receives (through the server) the first location information transmitted to the server (300) through the guardian terminal (100) or the first location information transmitted by the child terminal (50) to the server (300). The assistance terminal (200) compares/contrasts the first location information received with the second location information detected by the assistance terminal (200), and when a similarity between the location information(s) is higher than a preset or given value, a user of the assistance terminal (200) may generate and transmit to the server (300), a landmark information, which includes at least one of address, building name, business name, captured and other images, record and other files, and messages, by using an input unit of the assistance terminal (200).

The similarity between the location information(s) may be evaluated by using at least one of cosine similarity calculation, Tanimoto coefficient (similarity calculation), and rank-based similarity calculation methods.

Next, the server (300) generates the missing child's moving path using the landmark information transmitted by the assistance terminal (200): S160. The server (300) may generate the missing child's moving path by sorting the landmark information received from the assistance terminal (200) in a chronological order.

Next, the server (300) transmits to the guardian terminal (100), the missing child's moving path generated by the server (300): S170.

And then, the guardian terminal (100) displays the missing child's moving path transmitted by the server (300): S180.

The present invention may be implemented and executed as/by computer-readable code in a computer-readable recording medium. The computer-readable recording medium includes all types of recording devices for storing data, which is readable by a computer system. Examples of the computer-readable recording medium are a ROM, RAM, CD-ROM, magnetic tape, floppy disk, and optical data storage device and also include implementation as a form of a carrier wave (e.g., transmission via Internet). Also, the computer-readable recording medium may be dispersed or distributed in a network-connected computer system, and the computer-readable code, stored and executed according to a distribution method.

Exemplary embodiments of the present invention have been shown and described; however, the present invention should not be limited to a particular embodiment shown or described. A person skilled in the art should appreciate that modifications may be possible in various forms without departing from the spirit and scope of the present invention and that such modifications are within the scope of the accompanying claims.

What is claimed is:

1. A server for searching for missing children using mobile crowdsourcing comprising:
- a communication unit for
  - receiving a missing-child incident signal from a guardian terminal,
  - receiving a first location information as to movements of a missing child from a child terminal on the missing child,
  - transmitting the first location information received to at least one assistance terminal, and
  - receiving landmark information from the at least one assistance terminal when a degree of similarity between the first location information transmitted to the at least one assistance terminal and a second location information detected by, and stored in, the at least one assistance terminal is higher than a preset value,
    - wherein the similarity is calculated and evaluated based on a given signal strength among a plurality of wireless signals and information there from acquired at a given point or location by the at least one assistance terminal;
- and
- a control unit for generating a moving path of the missing child, using the landmark information received;
- wherein the second location information is location information as to where a user of the at least one assistance terminal was at a given time point before and where the user is after receiving the missing-child incident signal.

2. The server for searching for missing children using mobile crowdsourcing according to claim 1, further comprising
- a storage unit for storing the moving path of the missing child generated by the control unit.

3. The server for searching for missing children using mobile crowdsourcing according to claim 1, wherein the communication unit transmits the moving path of the missing child generated to the guardian terminal.

4. The server for searching for missing children using mobile crowdsourcing according to claim 1, wherein the first location information is wireless signal information detected by the child terminal.

5. The server for searching for missing children using mobile crowdsourcing according to claim 4, wherein the wireless signal information includes information from and associated with a source comprising at least one of nearby Wi-Fi access point and Bluetooth beacon.

6. The server for searching for missing children using mobile crowdsourcing according to claim 1, wherein the second location information is location information input by a user of the at least one assistance terminal.

7. The server for searching for missing children using mobile crowdsourcing according to claim 6, wherein the wireless signal information includes information from and associated with a source comprising at least one of nearby Wi-Fi access point and Bluetooth beacon.

8. The server for searching for missing children using mobile crowdsourcing according to claim 1, wherein the landmark information is information inputted by a user of the assistance terminal and transmitted to the communication unit and is at least one of address, building name, business name, image captured, recorded file and message.

9. The server for searching for missing children using mobile crowdsourcing according to claim 1, wherein the control unit sorts the second location information transmitted from the assistance terminal in a chronological order and generates the moving path of the missing child.

10. A system for searching for missing children using mobile crowdsourcing comprising:
- the server for searching for missing children according to claim 1;
- the child terminal for detecting wireless signal and transmitting the first location information based on the wireless signal detected to the guardian terminal or the server;

the guardian terminal for receiving the first location information from the child terminal and transmitting the first location information received and the missing-child incident signal to the server; and the at least one assistance terminal for receiving the first location information, and calculating and evaluating the similarity between the first location information transmitted and the second location information detected by the at least one assistance terminal, and generating and transmitting the landmark information to the server when the similarity evaluated is higher than a preset value.

11. The system for searching for missing children using mobile crowdsourcing according to claim 10, wherein the control unit sorts the second location information transmitted from the assistance terminal in a chronological order and generates the moving path of the missing child.

12. The system for searching for missing children using mobile crowdsourcing according to claim 10, wherein the guardian terminal comprises an interface unit for outputting the moving path of the missing child received from the server.

13. The system for searching for missing children using mobile crowdsourcing according to claim 10, wherein the child terminal transmits the first location information to the guardian terminal or the server using the wireless signal detected.

14. The system for searching for missing children using mobile crowdsourcing according to claim 10, wherein:

when the guardian terminal or the server requests the first location information, the child terminal transmits the first location information to the guardian terminal or the server by using the wireless signal detected.

15. The system for searching for missing children using mobile crowdsourcing according to claim 10, wherein the assistance terminal evaluates the similarity between the first location information received and the second location information self-detected by the assistance terminal by using at least one of cosine similarity, Tanimoto coefficient similarity, and rank-based similarity calculations.

16. The system for searching for missing children using mobile crowdsourcing according to claim 10, wherein the assistance terminal comprises an interface unit for outputting an assistance request message when the similarity is higher than the preset value.

17. The system for searching for missing children using mobile crowdsourcing according to claim 10, wherein the guardian terminal and the child terminal are connected via wireless connection.

18. A method for searching for missing children using mobile crowdsourcing, comprising:

a child terminal transmitting a first location information based on wireless signal detected to a guardian terminal;

the guardian terminal transmitting the first location information and missing child incident signal to a server;

the server transmitting the first location information received from the child terminal or the guardian terminal to an assistance terminal;

the assistance terminal first calculating and evaluating a similarity between the first location information transmitted and a second location information detected by the assistance terminal and then, only when the similarity evaluated is higher than a preset value, outputting an assistance request message to an interface unit of the assistance terminal;

the assistance terminal transmitting landmark information inputted by an assistance terminal user, who recognizes the assistance request message, to the server; and the server generating a moving path of the missing child using the landmark information transmitted.

19. The method for searching for missing children using crowdsourcing according to claim 18, further comprising the server transmitting the moving path generated to the guardian terminal.

20. The method for searching for missing children using crowdsourcing according to claim 19, wherein the method is performed by a program stored in a computer-readable recording medium.

* * * * *